(12) United States Patent
Grasnick

(10) Patent No.: US 6,176,582 B1
(45) Date of Patent: Jan. 23, 2001

(54) THREE-DIMENSIONAL REPRESENTATION SYSTEM

(75) Inventor: Armin Grasnick, Jena (DE)

(73) Assignee: 4D-Vision GmbH, Jena (DE)

(*) Notice: Under 35 U.S.C. 154(b), the term of this patent shall be extended for 0 days.

(21) Appl. No.: 09/485,450

(22) PCT Filed: Jun. 9, 1999

(86) PCT No.: PCT/EP99/04203

§ 371 Date: Feb. 10, 2000

§ 102(e) Date: Feb. 10, 2000

(87) PCT Pub. No.: WO99/66356

PCT Pub. Date: Dec. 23, 1999

(30) Foreign Application Priority Data

Jun. 12, 1998 (DE) ............................................. 198 25 950

(51) Int. Cl.[7] .................................................. G03B 21/14
(52) U.S. Cl. .............................. 353/7; 353/10; 359/478; 359/463
(58) Field of Search .................................... 353/7, 10, 38; 359/463, 466, 472, 478

(56) References Cited

U.S. PATENT DOCUMENTS

| | | |
|---|---|---|
| 4,101,210 | 7/1978 | Lo et al. . |
| 4,935,335 * | 6/1990 | Fotland ................................. 430/324 |
| 5,074,649 | 12/1991 | Hamanaka . |
| 5,471,881 | 12/1995 | Hochstein . |
| 5,757,545 * | 5/1998 | Wu et al. ............................. 359/463 |
| 6,016,225 * | 1/2000 | Anderson ............................. 359/463 |
| 6,046,848 * | 4/2000 | Gulick, Jr. .......................... 359/463 |

FOREIGN PATENT DOCUMENTS

| | | |
|---|---|---|
| 687 495 | 1/1940 | (DE) . |
| 29 11 375 | 10/1980 | (DE) . |
| 62-77794 | 4/1987 | (JP) . |
| 7-64020 | 3/1995 | (JP) . |

OTHER PUBLICATIONS

XP–002122049 / IBM Technical Disclosure Bulletin, vol. 29, No. 1, Jun. 1986 (pp. 276–279) "Light Diffuser with Controlled Divergence".

* cited by examiner

*Primary Examiner*—William C. Dowling
(74) *Attorney, Agent, or Firm*—Reed Smith LLP

(57) ABSTRACT

A system is disclosed for the three-dimensional representation of scenes and/or objects from planar layer images which are obtained from scaled representation planes in the spatial depth of the scenes and/or objects. To this end, a plurality of adjacent representation elements are provided, wherein said elements are perpendicular to the vision direction of an observer or a camera. The representation elements are arranged relative to each other so as to define a flat raster comprising a plurality of lines and columns. Two at least of these adjacent representation elements, in a line and a column of this raster, have different focal distances. The number of different focal distances corresponds to the number of scaled representation planes in the spatial depth. The representation elements having the same focal distance are always associated with the same representation planes. A portion of a planar layer image is placed in the optical axis of each representation element. Portions of this same planar layer are further provided in the beam path of the representation elements having the same focal distance.

7 Claims, 3 Drawing Sheets

SECTION AA

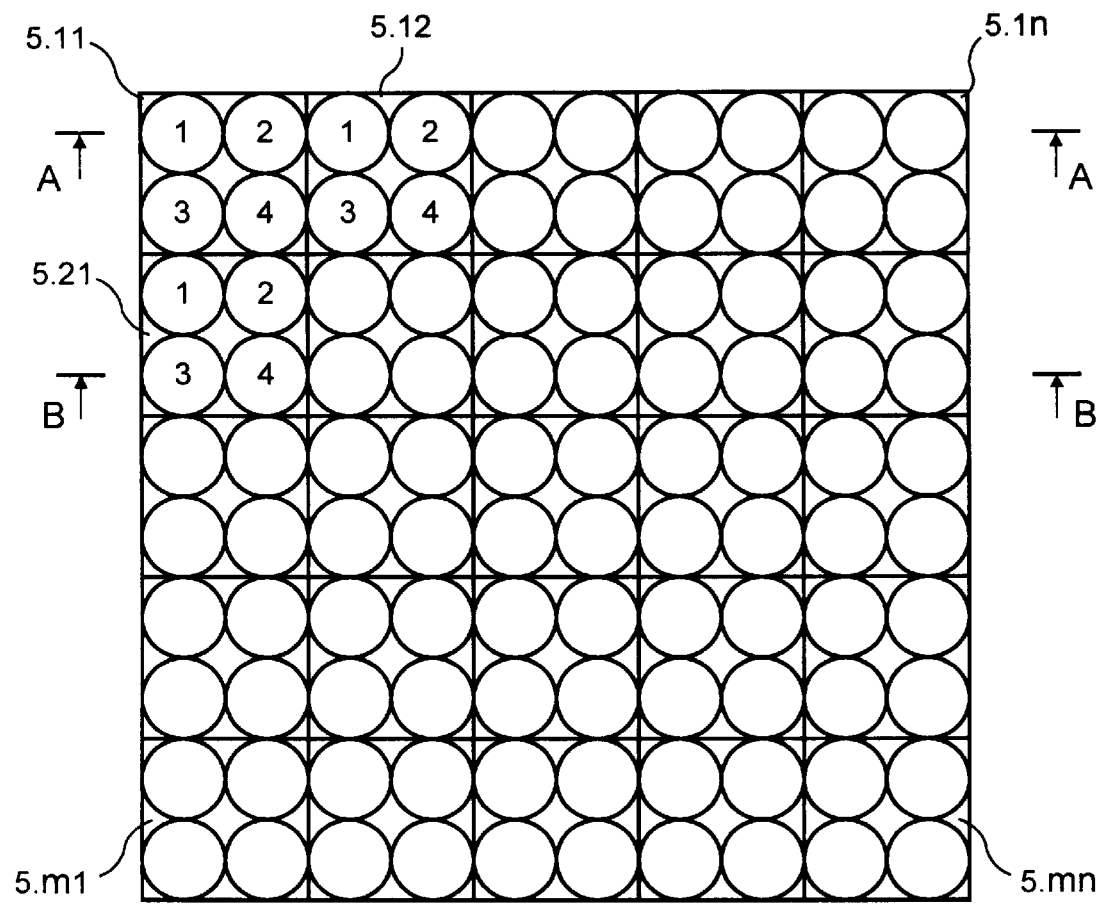
F I G. 1

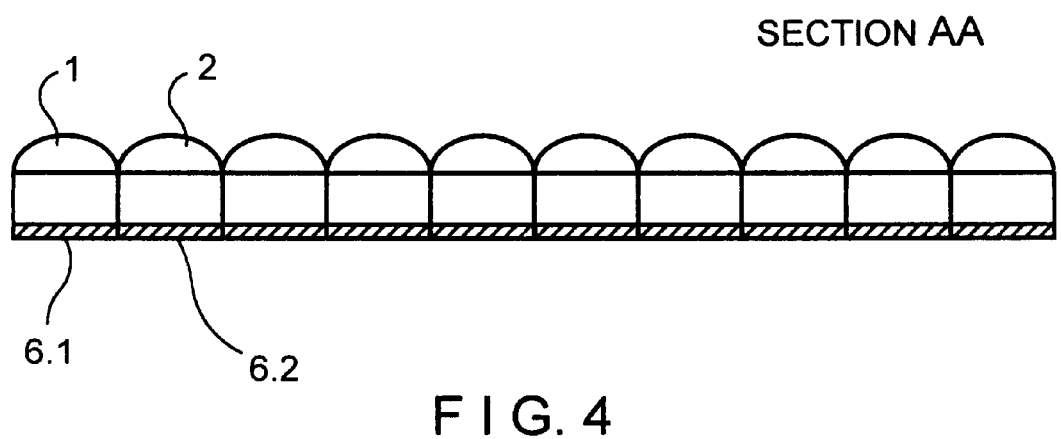
F I G. 4
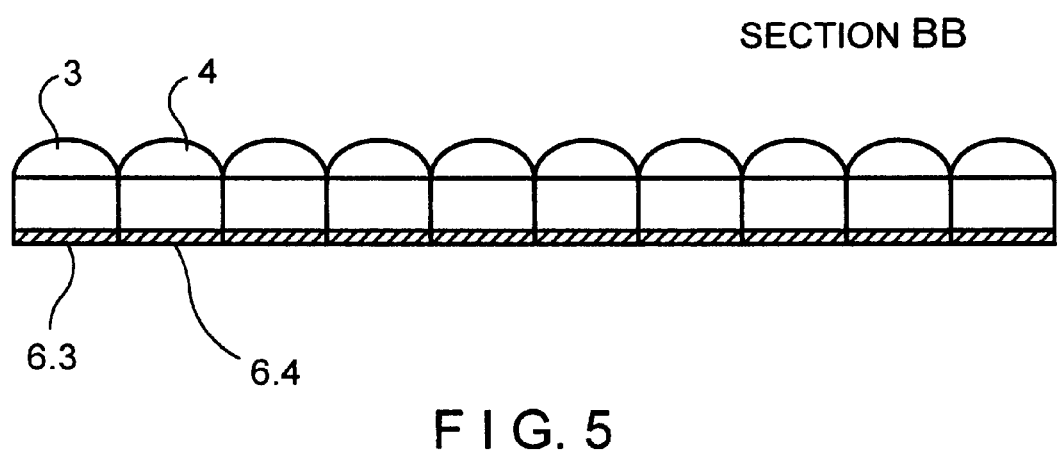
F I G. 5

THREE-DIMENSIONAL REPRESENTATION SYSTEM

BACKGROUND OF THE INVENTION

1. Field of the Invention

The invention is directed to an arrangement for the three-dimensional display or representation of scenes and/or objects based on planar layer images which have been obtained from different imaging planes which are offset with respect to the spatial depth of the scenes and/or objects.

2. Description of the Related Art

The procedures and arrangements known in the prior art for spatial representation of objects can be classified in three groups, in principle. In a first group, one of two images recorded from different viewing angles is allocated to one eye. Through suitable means, each eye is permitted to view the image allocated to it, but not the other image. These means ensure that each eye sees only the image allocated to it and are, for example, red-green spectacles, polarizing spectacles, and so forth.

It can also be ensured by means of appropriately arranged lenticular screens or prism screens such as split-image displays which split up the image that each eye is presented only with the image allocated to it.

However, a disadvantage consists in the fact that viewing positions and viewing distances are generally fixed at the outset and there is no possibility of accommodation of the eye. For this reason, viewing of the spatial representation achieved in this manner leads to fatigue. Further, the means required for viewing are sometimes quite elaborate, which increases cost.

In a second group of arrangements known from the prior art, the spatial representation is achieved in that the image and/or the projection of the image takes up volume. A substantial disadvantage in this case is that mechanically moving component assemblies are required which serve to project images at different spatial depths, for example, like rotating disks in a cathode ball, rotating LED surfaces or a rotating helix. This results in quite a high requirement of material and time and accordingly leads to unwanted costs since, on the one hand, precise manufacture is necessary for the moving component assemblies, whose movement must be carried out exactly, and, on the other hand, constructions of this type are also subject to wear resulting in increased expenditure on maintenance.

This group also includes a three-dimensional display device according to JP 62-77794 A which is formed from an image display device, a group of many fine, convex lenses with adjustable focal length, and another convex lens located opposite to the group of fine convex lenses. For example, the fine convex lenses are liquid crystal lenses with adjustable focal length, wherein control signals based on image depth information are applied to these lenses. When this arrangement is operated, various two-dimensional images, namely, images extending in the horizontal and vertical directions, are displayed on the image display device and can be viewed through the additional convex lens through corresponding control of the liquid crystal lenses or adjustment of focal lengths associated with the images so as to form an image which can be perceived in a three-dimensional manner.

However, the relatively elaborate optical-mechanical and optical-electronic construction and the rather large resulting constructional depth of 90 cm are disadvantageous. Also, an unwanted effect which is expected to occur is that the eye accommodated to large distances favors the raster of fine convex lenses or the raster of intermediate spaces between these lenses and does not perceive an undisturbed three-dimensional representation, which is what is actually desired. Further, the intended use on TFT displays (for miniaturization) may encounter problems, e.g., because of an unrealizable linear magnification of the optical system comprising the fine convex lenses and the additional convex lens.

Further, JP 07-64 020 A describes a three-dimensional display and a method for displaying by means of this display. According to this reference, three-dimensionally moving images can be displayed quickly and simply and can be viewed without spectacles in a large space.

For this purpose, there is a plurality of display elements which are outfitted with a convex lens having a short focal length, a light source and a stretching mechanism located between the lens and light source and which are arranged on a display surface. A three-dimensional image is generated in that the distance between the convex lenses and the light sources is changed by actuating the stretching mechanism, so that the position of the image of the light source formed by the convex lens is displaced. A three-dimensional image is formed by specifically changing the position of the virtual and real images of the light sources.

Apart from a construction which is also rather complicated in this case, a further disadvantage consists in that the aperture aberration of the convex lenses themselves is not corrected, resulting in low-quality imaging and small differences in image depths.

In a third group, images are imaged in volume. This is achieved, for example, by an acoustic-modulated concave mirror, computer-generated holograms using an acousto-optic modulator or making use of mercury vapor fluorescence by infrared excitation. These methods and arrangements are relatively complicated and therefore costly.

OBJECT AND SUMMARY OF THE INVENTION

Against this background, it is the primary object of the invention to provide an arrangement for the three-dimensional reproduction of scenes and/or objects in which imaging is carried out without projection surfaces and without the use of moving component assemblies and which requires no additional auxiliary means for the observer.

According to the invention, this object is met in that a plurality of imaging elements are provided adjacent to one another vertical to the viewing direction of an observer, wherein the imaging elements are positioned relative to one another in a planar raster of lines and columns. In this connection, at least two of the imaging elements adjacent to one another in a line and in a column of this raster have focal lengths which differ from one another and the quantity of different focal lengths corresponds to the quantity of imaging planes which are offset in spatial depth. Further, imaging elements with the same focal length are always associated with the same imaging planes. A part of a layer image is positioned in the optical axis of every imaging element, wherein portions of the same layer image are always provided in the beam path of imaging elements of identical focal length.

Therefore, it is achieved in an advantageous manner that scenes and objects of which a plurality of layer images have been recorded from different imaging planes can be spatially reproduced by simple means. This is carried out in that the individual layer images are imaged by the respective correlated imaging elements in the focal plane corresponding to their imaging plane.

In a special arrangement of the invention, it can be provided that the parts of the layer images correlated with the imaging elements are positioned in the image planes of the imaging elements. Accommodation of the observer's eye is therefore facilitated; the individual layer images are perceived with good sharpness and accordingly convey a real three-dimensional impression of the represented object.

A good resolution can be achieved when the imaging elements are arranged in sufficient quantity so as to be distributed over the raster. Imaging elements with identical focal lengths should advantageously be positioned equidistant from one another. For the observer, the layer images are nested one inside the other and each individual layer image is shown in the imaging plane allocated to it; the layer images made available for simultaneous observation accordingly convey a good spatial impression of the object to be represented or of a scene.

The essential advantage of this arrangement consists in that moving optical elements are not required. Further, in contrast to the prior art, the spatial impression is also formed when observing with only one eye, i.e., with the arrangement according to the invention it is also possible to achieve the impression of a spatial representation with only one eye.

In a preferred embodiment of the invention, plano-convex lenses are provided as imaging elements. Raster arrangements with plano-convex lenses can be produced economically in that the convexity or curvature of these lenses are impressed, for example, on the surface of a flat transparent body.

Of course, it is also possible to provide biconvex lenses, Fresnel lenses, lens combinations, e.g., of convex lenses and concave lenses, etc., in the raster arrangement. It is likewise conceivable to arrange diaphragms in the beam path of the imaging elements for purposes of improving the imaging characteristics or to provide color filters, so that the individual layer images are perceivable to the observer as different.

In an especially preferred embodiment of the invention, plano-convex lenses are provided with four different focal lengths within the raster. Four such plano-convex lenses with focal lengths that are different from one another are geometrically combined to form a raster line in which they are arranged in a square or honeycomb shape. A plurality of raster lines of this type are arranged adjacent to one another in lines and columns and fill up the entire raster. In this respect, there are always parts of the same one of the four layer images arranged in the focal plane of plano-convex lenses of identical focal length.

In this way, it is possible to achieve a spatial representation in a relatively simple and easily producible manner because, according to the invention, even four imaging planes offer very good spatial impressions. Of course, it is possible in further embodiments of the invention to arrange a large quantity of optically imaging elements adjacent to one another with different focal lengths corresponding to this quantity and to combine them in raster lines, so that it is possible to represent a large quantity of imaging planes one over the other.

In a further advantageous embodiment of the invention, it can be provided that four plano-convex lenses are provided in each of the raster lines, each of which has one of the following focal lengths: 100 mm, 85 mm, 70 mm and 50 mm. In this way, it is possible to represent layer images which, on the one hand, are offset with respect to depth at equal distances from one another and which, on the other hand, convey a sufficiently good spatial impression.

The offsetting with respect to depth and the quantity of imaging planes in the embodiment of the invention should depend on the type of object to be viewed in a three-dimensional manner. In representing rough surfaces in which the spatial depth is quite small, the distances in the depth offsetting can also be kept relatively small. In objects with greater spatial depth, on the other hand, higher quantities of imaging planes and, to this extent, also imaging elements in a higher quantity of different focal lengths are recommended.

Further, the invention can also be arranged in such a way that each of the plano-convex lenses has a diameter of 1 millimeter and 100 raster lines with four plano-convex lenses in every line and 100 raster lines with four plano-convex lenses in every column. Therefore, a very good resolution is achieved in the three-dimensional reproduction of the layer images.

The layer images can be obtained by methods known in the prior art as is described, for example, in DE-OS 29 11 375, wherein it is necessary to meet the condition that the individual layer images correspond to one of the imaging planes which can be represented with the arrangement according to the invention. Every layer image is then divided into a quantity of parts which corresponds to the quantity of imaging elements of identical focal length. Each of these parts is allocated to one of the imaging elements and positioned in the focal plane of the imaging element in question.

In addition to the embodiment forms and variants of the invention shown herein, it is conceivable that the individual imaging elements or lenses are constructed so as to have diameters which differ from one another. On the other hand, it is also possible to represent the individual layer images in different scales, so that a balancing of different magnifications can be carried out.

Further, it lies within the scope of the invention to form the imaging elements which are allocated to a common imaging plane or layer image with infinite focal length. In this way, the parts of the corresponding layer image can be perceived by the observer in a scale of 1:1.

BRIEF DESCRIPTION OF THE DRAWINGS

The invention will be described more fully in the following with reference to an embodiment example. Shown in the accompanying drawings are:

FIG. 1 shows the basic representation of an image field with the arrangement of optically imaging elements according to the invention;

FIG. 4 illustrates section AA from FIG. 1 with the arrangement of the partial images outside the focal plane;

FIG. 5 illustrates section BB from FIG. 1 with the arrangement of the partial images outside the focal plane.

DESCRIPTION OF THE PREFERRED EMBODIMENT

Figure 2:
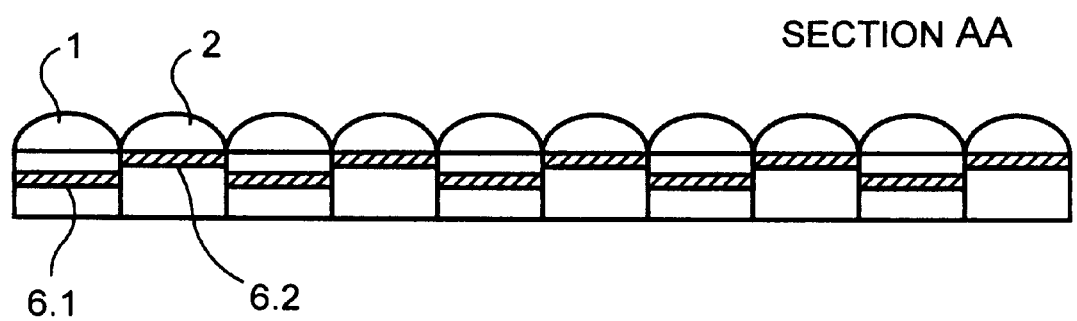
FIG. 2 illustrates a section AA from FIG. 1 with the arrangement of the partial images in the focal plane.

In FIG. 1, there is a plurality of imaging elements 1, 2, 3, 4 which are located next to one another in lines and columns within a planar raster 5. The imaging elements 1 to 4 are plano-convex lenses, for example. All imaging elements designated by 1 have the same focal length, and all imaging elements designated by 2, 3 and 4, respectively, likewise have the same focal length. However, the focal length of the imaging elements designated by 1 is different from the focal length of the imaging elements designated by 2. Likewise, the focal lengths of the imaging elements 3 and 4 differ from one another, and so forth.

For example, imaging element 1 has focal length 70 mm, imaging element 3 has focal length 100 mm, imaging element 2 has focal length 50 mm and imaging element 4 has focal length 85 mm.

It will further be seen in FIG. 1 that one each of the imaging elements 1, 2, 3, 4 are assembled in a raster line 5.mn. Raster lines 5.11, 5.12 . . . 5.1n are arranged in a line, while raster lines 5.11, 5.21 . . . 5.m1 are arranged in a column.

Further, it will be seen that the position of the individual imaging elements 1, 2, 3, 4 with respect to one another in every raster line 5.11–5.mn is identical. This means that the imaging elements 1 and 2 lie next to one another in a first line, while the imaging elements 3 and 4 lie next to one another in the following line. In a first column, the imaging elements 1 and 3 are adjacent to one another; in the following column, imaging elements 2 and 4 are adjacent to one another.

The view in FIG. 2 corresponds in principle to section AA from FIG. 1. The different focal lengths of the imaging elements 1 and 2 are shown by different curvatures at their surface. It will further be seen in FIG. 2 that different parts 6 of a layer image are correlated with the imaging elements with different focal lengths. Accordingly, parts of layer image 6.1, for example, are correlated with imaging elements 1 and parts of a layer image 6.2 are correlated with imaging elements 2.

Figure 3:
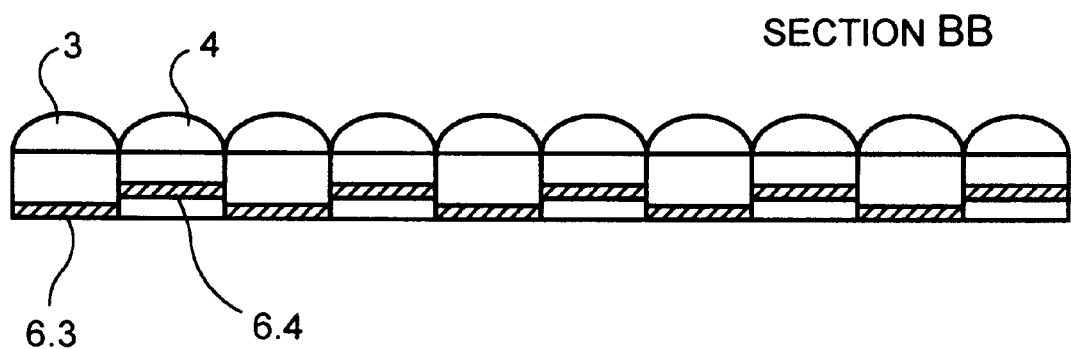
FIG. 3 illustrates a section BB from FIG. 1 with the arrangement of the partial images in the focal plane.

An analogous view is shown in FIG. 3, in which it will be seen that parts of a layer image 6.3 are correlated with imaging elements 3 and parts of a layer image 6.4 are correlated with imaging elements 4.

In FIG. 2 and FIG. 3, the partial images 6.1 to 6.4 are arranged, for example, in the respective focal plane of the respective correlated imaging element 1 to 4. On the other hand, FIG. 4 and FIG. 5 show an arrangement of the invention in which the partial images 6.1 to 6.4 are arranged on a common planar surface rather than in the focal planes of the imaging elements 1 to 4. This results in technologically beneficial preconditions for printing the partial images on a physical medium.

These illustrations clearly show that parts of the same layer image are always arranged under imaging elements of the same focal length. Therefore, every imaging element 1, 2, 3, 4 is responsible for imaging the part of a layer image allocated to it in a separate imaging plane.

When the raster is observed with imaging elements 1 to 4 viewed simultaneously, all imaging planes are perceived by the observer, wherein, however, the eye focusses in different imaging planes depending on the different focal planes. Every part or every layer image is accordingly represented in the spatial depth associated with it. In this way, objects can be shown three-dimensionally, wherein the depth resolution depends on the quantity of imaging planes.

While the foregoing description and drawings represent the present invention, it will be obvious to those skilled in the art that various changes may be made therein without departing from the true spirit and scope of the present invention.

What is claimed is:

1. An arrangement for the three-dimensional representation of scenes and/or objects based on planar layer images which reproduce different imaging planes of the scenes or objects, in which imaging planes are offset with respect to spatial depth comprising:

a plurality of imaging elements with fixed focal lengths being provided perpendicular to the viewing direction of an observer or camera so as to be adjacent to one another in a planar raster of lines and columns, the layer images being observed or recorded through said imaging elements;

at least two of the imaging elements adjacent to one another in a line or in a column of said raster having focal lengths which differ from one another;

the quantity of imaging elements with different focal lengths corresponding to the quantity of imaging planes which are offset in spatial depth;

imaging elements with the same focal length being always associated with the same imaging planes; and a part of a layer image being arranged in the optical axis of every imaging element, and parts of the same layer image being always allocated to imaging elements of identical focal length.

2. The arrangement according to claim 1, wherein the parts of the layer images correlated with the imaging elements are positioned in the image planes of the imaging elements.

3. The arrangement according to claim 1, wherein lenses with a spherical or aspherical optically active surface are provided.

4. The arrangement according to claims 3, wherein said lenses are plano-convex.

5. The arrangement according to claim 1, wherein plano-convex lenses with four different focal lengths are provided as imaging elements, each of said four plano-convex lenses with different focal lengths being combined in a honeycomb-shaped raster line, wherein a plurality of raster lines of this kind are arranged next to one another so as to fill the entire raster, and wherein a quantity of four layer images are provided, whose parts are arranged in the focal planes of the associated plano-convex lenses.

6. The arrangement according to claim 5, wherein a circular plano-convex lens with focal lengths 100 mm, 85 mm, 70 mm and 50 mm, respectively, are provided in each raster line.

7. The arrangement according to claim 6, wherein the plano-convex lenses are arranged on a common sheet, wherein each of the convex lenses has a diameter of 1 mm and, in each instance, 100 raster lines each with four plano-convex lenses are arranged in each line and, in each instance, 100 raster lines each with four plano-convex lenses are arranged in every column.

* * * * *